United States Patent [19]

Kim

[11] Patent Number: 6,006,006
[45] Date of Patent: *Dec. 21, 1999

[54] FRAME PULSE GENERATION APPARATUS FOR A VIDEO CASSETTE RECORDER

[75] Inventor: Byeong-soo Kim, Kwachun, Rep. of Korea

[73] Assignee: Samsung Electronics Co., Ltd., Kyungki-do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/736,990

[22] Filed: Oct. 25, 1996

[30] Foreign Application Priority Data

Oct. 27, 1995 [KR] Rep. of Korea ...................... 95-37677

[51] Int. Cl.⁶ ...................................................... H04N 5/95

[52] U.S. Cl. .............................................. 386/85; 386/88

[58] Field of Search .................................. 386/46, 68, 81, 386/80, 13, 16, 17, 67, 79, 85, 87, 86, 47, 48, 84, 88, 100; H04N 5/95

[56] References Cited

U.S. PATENT DOCUMENTS

| | | | |
|---|---|---|---|
| 4,745,493 | 5/1988 | Gedl et al. | 386/17 |
| 5,648,879 | 7/1997 | Takano | 386/81 |

*Primary Examiner*—Huy Nguyen
*Attorney, Agent, or Firm*—Sughrue, Mion, Zinn, Macpeak & Seas, PLLC

[57] ABSTRACT

A frame pulse generation apparatus for a SD-VCR generates a correct frame pulse even though a track pair number differs from an original one due to an error, to obtain an accurate picture. A frame base pulse generator compares the track pair number detected from a reproduced signal with a reference number and generates a frame base pulse toggled whenever the comparison result represents consistency. A phase-locked-loop (PLL) circuit controls the phase and period of the generated frame base pulse to be constant, and outputs a final frame pulse. The apparatus also greater a reference frame pulse a stable clock obtained by dividing the system clock and controlling the rotational speed of a drum so that track pair number detected at the level transition point of the reference frame pulse becomes a desired number, in order to contain one-frame data within the reference frame pulse. Thus, a normal reproduced picture can be formed irrespective of errors.

4 Claims, 6 Drawing Sheets

526/60 SYSTEM(NTSC)

625/50 SYSTEM (PAL)

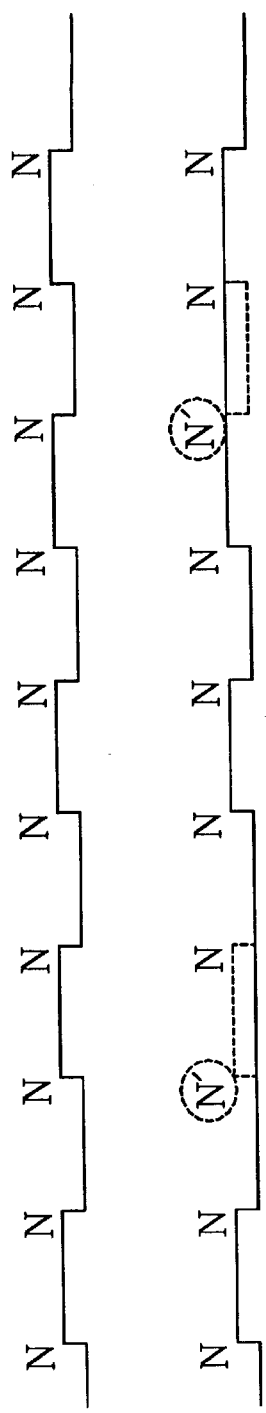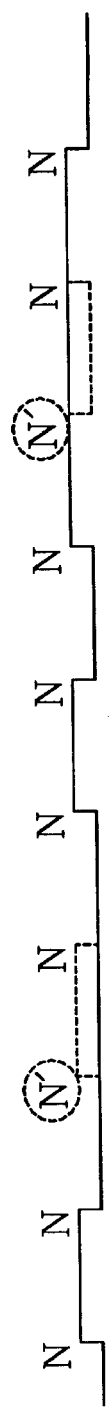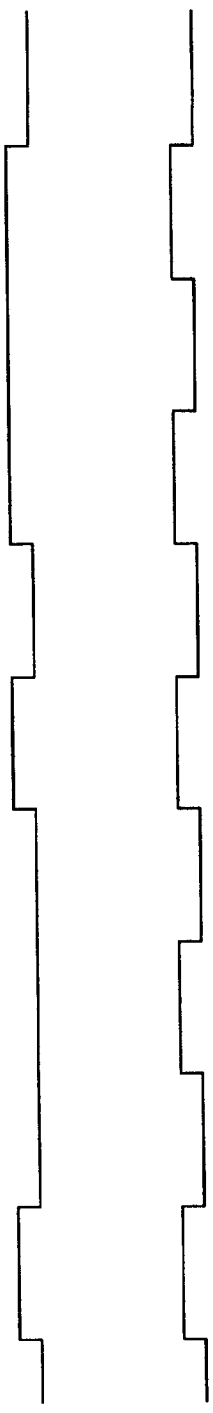
PRIOR ART
FIG. 4A
PRIOR ART
FIG. 4B
FIG. 6A
FIG. 6B

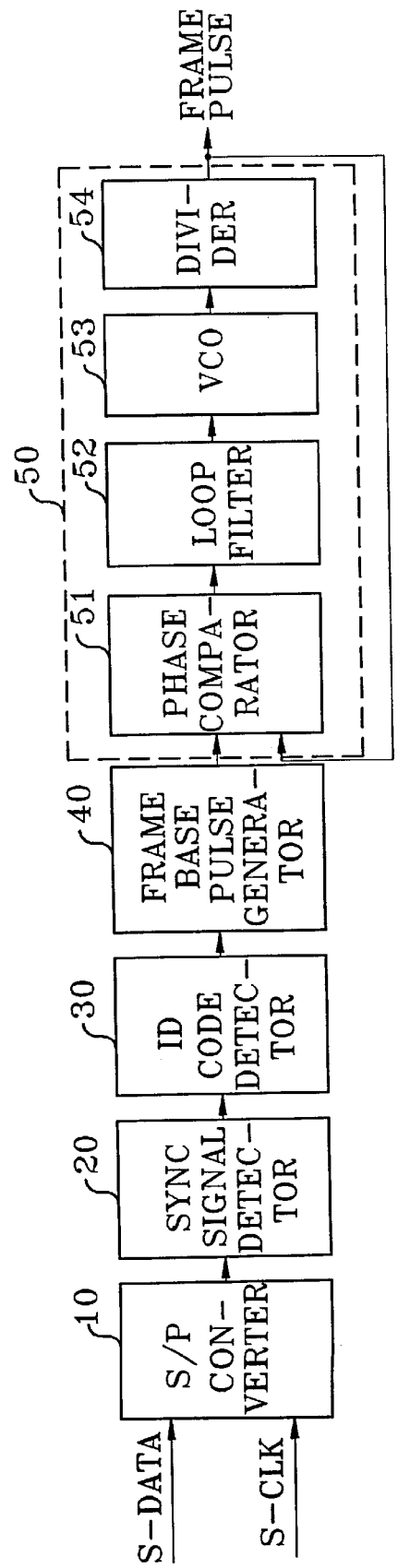

FRAME PULSE GENERATION APPARATUS FOR A VIDEO CASSETTE RECORDER

BACKGROUND OF THE INVENTION

The present invention relates to a frame pulse generation apparatus for a standard definition video cassette recorder (SD-VCR), and more particularly, to a frame pulse generation apparatus which generates for a correct frame pulse to form an accurate picture in a SD-VCR, even though an error occurs in a playback signal.

Development of a semiconductor technology has enabled digital signal processing to be applied to fields of wide-band video and audio recording and reproducing, among others. In addition, development of a recording and reproduction medium and recording and reproduction technology has enabled general home VCRs to utilize digital signal processing.

FIGS. 1A and 1B illustrate a relationship between a track and a frame in a SD-VCR system, one-frame data is recorded in ten tracks in a 525/60 system of NTSC and in twelve tracks in a 625/50 system of PAL. That is, assuming that a number is assigned to each track, one-frame data is recorded in the 0th to 9th tracks on a video tape in a NTSC system, and in the 0th to 11th tracks in a PAL system. Thus, when a signal is reproduced from a video tape, the 0th to 9th tracks in the NTSC system and the 0th to 11th tracks in the PAL system should be contained in a one-frame pulse. If the phase of the frame pulse with respect to the one-frame tracks deviates, a normal picture cannot be formed.

Referring to FIG. 2, four sectors such as an insert and track information (ITI) sector, an audio sector, a video sector and a sub-code sector are arranged in each track. Among them, the audio sector and video sector include a total of 169 sync blocks. Each sync block includes 90 bytes in which sync areas SYNC0 and SYNC1 occupy 2 bytes, identification (ID) codes ID0, ID1 and ID2 occupy 3 bytes, and data fields DATA0-DATA84 occupy 85 bytes. A sync pattern is inserted into the sync area. An ID includes a 2-byte ID data and a 1-byte ID parity. Information representing a current track and the track pair number, which represents a pair of two neighboring tracks as 4 bits, are recorded in an area indicated by ID0 and ID1. Also, all sync blocks in a track have the same track pair number, which varies for every other two tracks. Table 1 shows a relationship between a track pair number and a track.

TABLE 1

| Track Pair No. | 525/60 System | 625/50 System |
| --- | --- | --- |
| 0 | Track 0 & 1 | Track 0 & 1 |
| 1 | Track 2 & 3 | Track 2 & 3 |
| 2 | Track 4 & 5 | Track 4 & 5 |
| 3 | Track 6 & 7 | Track 6 & 7 |
| 4 | Track 8 & 9 | Track 8 & 9 |
| 5 | Reserved | Track 10 & 11 |

Meanwhile, when reproducing a playback signal, a head is not controlled with respect to which track should be read first among the various tracks. Accordingly, it is necessary to form one-frame of data within a one-frame pulse without being out of phase, using read-out data.

FIG. 3 shows a flowchart for explaining a frame pulse generation operation in a conventional SD-VCR. An ID code is detected among the reproduced data in step 1, and a track pair number is detected from the detected ID code in step 2. In step 3, the detected track pair number is compared with a reference number "N" and a determination is made as to whether the former is consistent with the latter. Here, the reference number "N" is 4 in case of the 525/60 NTSC system, and 5 in case of the 625/50 PAL system. In step 4, transition of a frame pulse level is performed whenever the detected track pair number is consistent with the reference number "N." Since the track pair number is detected in sequence of "0011223344" in NTSC systems, transition of a frame pulse level is performed at the time when a track pair number "4" ends or "0" starts. Since the track pair number is detected in sequence of "001122334455" in PAL systems, transition of a frame pulse level is performed at the time when a track pair number "5" ends or "0" starts. If the detected track pair number is inconsistent with the reference number "N," the program returns to step 1 to perform the steps 1-4 repetitively. That is, transition of the frame pulse level is performed everytime the track pair number becomes "N" as shown in FIG. 4A. As a result, the frame pulse is subject to level-transition for every 10 tracks in NTSC systems and for every 12 tracks in PAL systems.

However, when a detected track pair number differs from an original one due to a detected ID code which contains an error, a level transition does not occur at the time (N') where the level transition should occur, as shown in FIG. 4B. In this case, accurate signal processing to form a normal picture is not possible.

SUMMARY OF THE INVENTION

To solve the above problem, it is an object of the present invention to provide a frame pulse generation apparatus for a SD-VCR for generating a normal frame pulse even though a detected track pair number differs from an original one due to an error-occurring reproduced signal.

According to one aspect of the present invention to accomplish the above object, there is provided a frame pulse generation apparatus comprising:

frame base pulse generation means for generating a frame base pulse based on a track pair number contained in a signal reproduced from a video tape and a reference signal; and a phase-locked-loop (PLL) circuit for receiving the frame base pulse supplied from the frame base pulse generation means and outputting a final frame pulse whose phase and period are consistently adjusted.

According to another aspect of the present invention, there is provided a frame pulse generation apparatus for a SD-VCR comprising:

means for detecting a track pair number from a signal reproduced from a video tape; means for generating a reference frame pulse using a stable clock obtained by dividing a system clock; a comparator for comparing a reference number corresponding to a level transition point of the reference frame pulse generated in the reference frame pulse generation means with the track pair number detected in the track pair number detection means; and a drum speed controller for controlling a drum speed according to a comparison result of the comparator so that reproduced data corresponding to one-frame is contained in the reference frame pulse.

According to still another aspect of the present invention, there is provided a frame pulse generation apparatus for a SD-VCR comprising:

frame base pulse generation means for generating a frame base pulse based on a pilot frequency signal contained in a signal reproduced from a video tape; and a phase-locked-loop (PLL) circuit for receiving the frame base pulse supplied from the frame base pulse generation means and outputting a final frame pulse whose phase and period are consistently adjusted.

BRIEF DESCRIPTION OF THE DRAWINGS

The preferred embodiments are described with reference to the drawings wherein:

FIGS. 4A and 4B are views for explaining the generation of frame pulses according to the conventional art, in which FIG. 4A shows a normal frame pulse and FIG. 4B shows a frame pulse when an error occurs in a track pair number.

FIG. 5 is a block diagram of a frame pulse generation apparatus for a SD-VCR according to a preferred embodiment of the present invention.

FIGS. 6A and 6B are views for explaining the generation of frame pulses according to the present invention, in which FIG. 6A shows a frame pulse according to a detected track pair number and FIG. 6B shows a frame pulse which has been corrected according to a PLL circuit.

DETAILED DESCRIPTION OF PREFERRED EMBODIMENTS OF THE PRESENT INVENTION

Figure 1A:
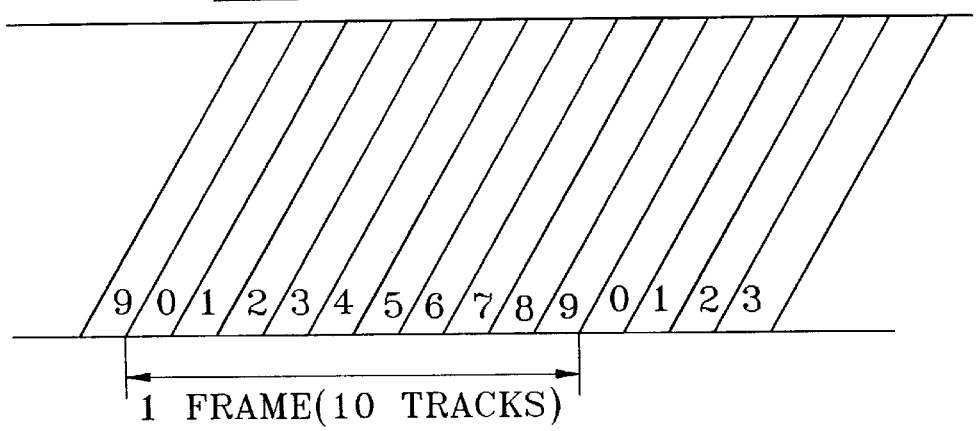
FIGS. 1A and 1B are views showing a relationship between a track and a frame in a 525/60 system and a 625/50 system for a SD-VCR, respectively.
Figure 1B:
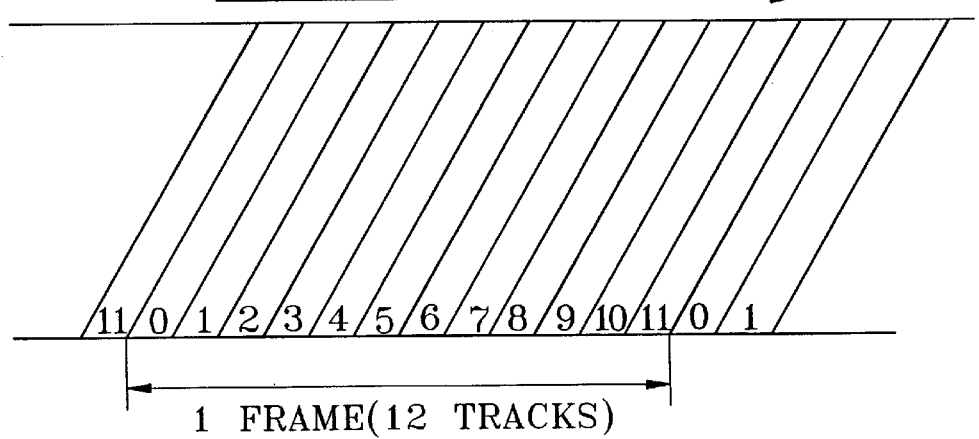
Figure 2:
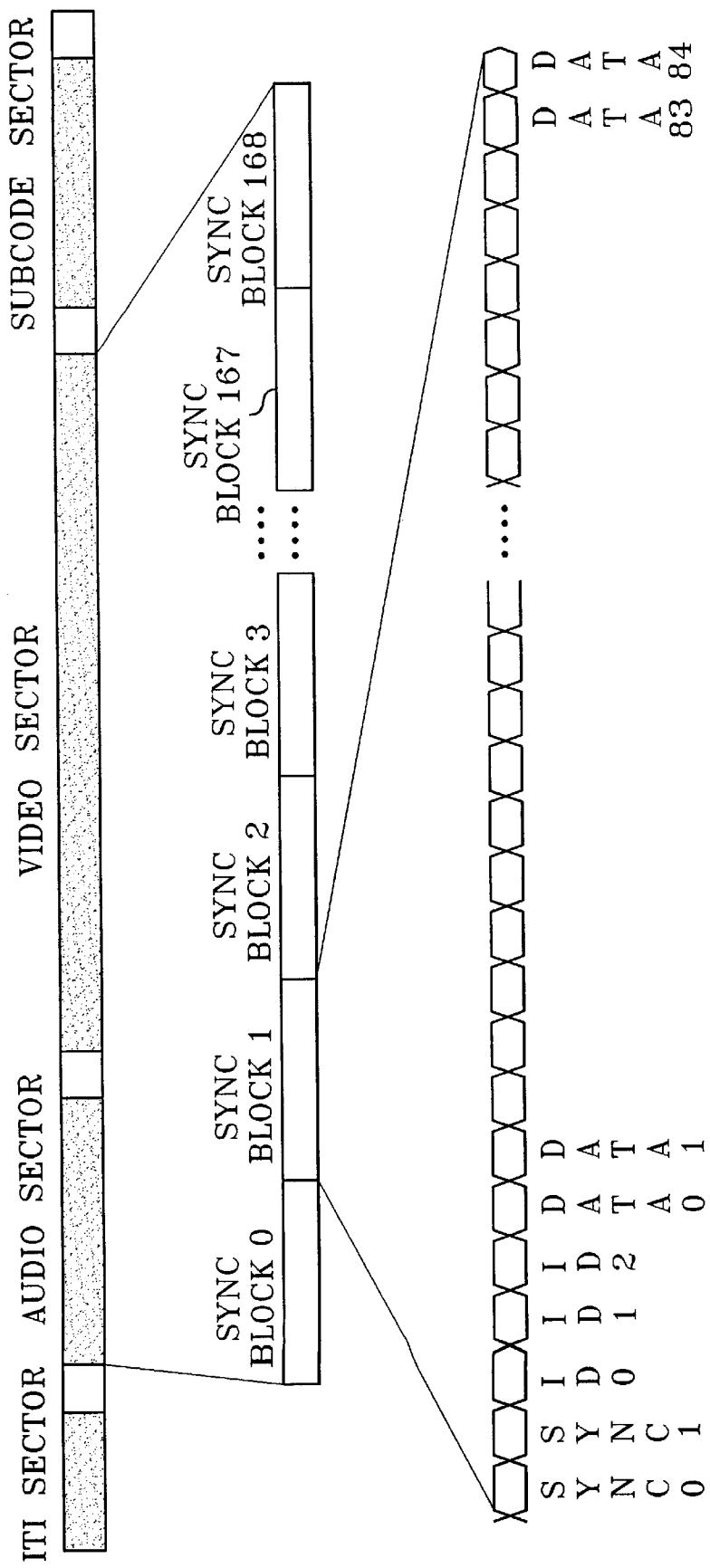
FIG. 2 shows a recording pattern of each track on a SD-VCR tape.
Figure 3:
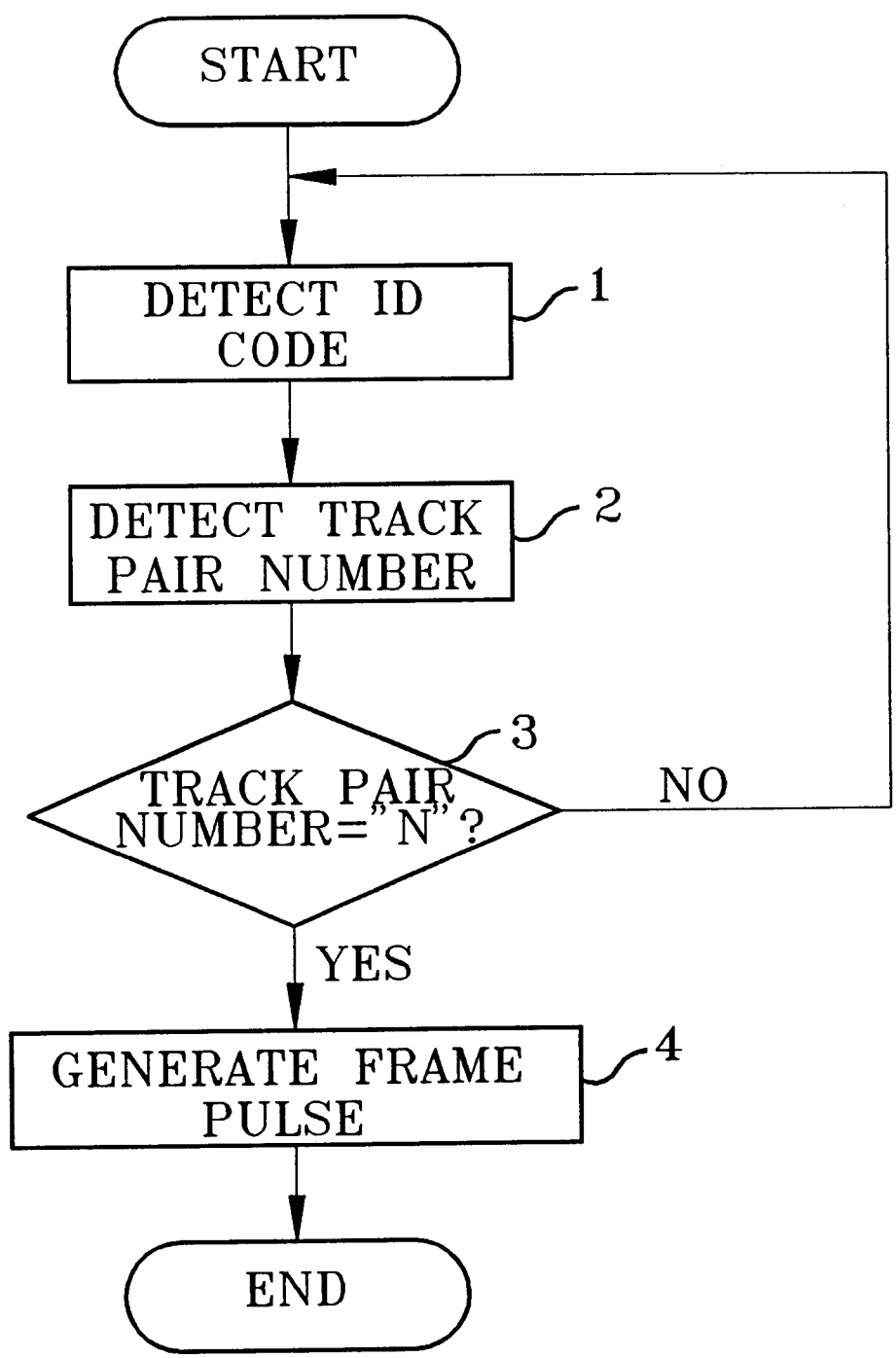
FIG. 3 is a flowchart for explaining a frame pulse generation operation in a conventional SD-VCR.

Preferred embodiments of the present invention will be described below in more detail with reference to the accompanying drawings.

Referring to FIG. 5, a serial-to-parallel (S/P) converter 10 receives reproduced serial data s-data and serial clock s-clk, and converts the serial data s-data into parallel data of predetermined bits according to the serial clock s-clk. A sync signal detector 20 detects a sync signal from the parallel data output from the S/P converter 10. An ID code detector 30 detects an ID code which follows the sync signal detected in the sync signal detector 20.

A frame base pulse generator 40 receives the ID code detected by the ID code detector 30 and detects a track pair number contained in the ID code. Then, the detected track pair number is compared with a reference number "N" and a determination is made as to whether the former is consistent with the latter. The frame base pulse generator 40 generates a frame pulse whose level transition is performed whenever the detected track pair number is consistent with the reference number "N." Here, the level transition of the generated frame pulse is accurately performed at the time a level transition should be performed, in a normal state where an error does not occur as shown in FIG. 4A. However, the level transition is not accurately performed when an error occurs as shown in FIG. 6A. Thus, the FIG. 5 apparatus includes a PLL circuit 50 for outputting a frame pulse, in which the phase of the frame pulse is synchronized.

A phase comparator 51 in the PLL circuit 50 compares the phase of the frame base pulse generated the frame base pulse generator 40 with that of the frame pulse fedback from a divider 54, and outputs the result to a loop filter 52. The loop filter 52 applies a control voltage to a voltage controlled oscillator (VCO) 53 according to the result of the phase comparison. The VCO 53 produces a signal oscillating at a predetermined frequency according to the control voltage. Here, the VCO 53 oscillates at the frequency of K times the frame pulse in which K is a natural number. The divider 54 divides the oscillation frequency of the VCO 53 into K times and feeds the divided result back to the phase comparator 51. Also, the divider 54 outputs a frame pulse whose phase and frequency are constant as shown in FIG. 6B.

Figure 7:
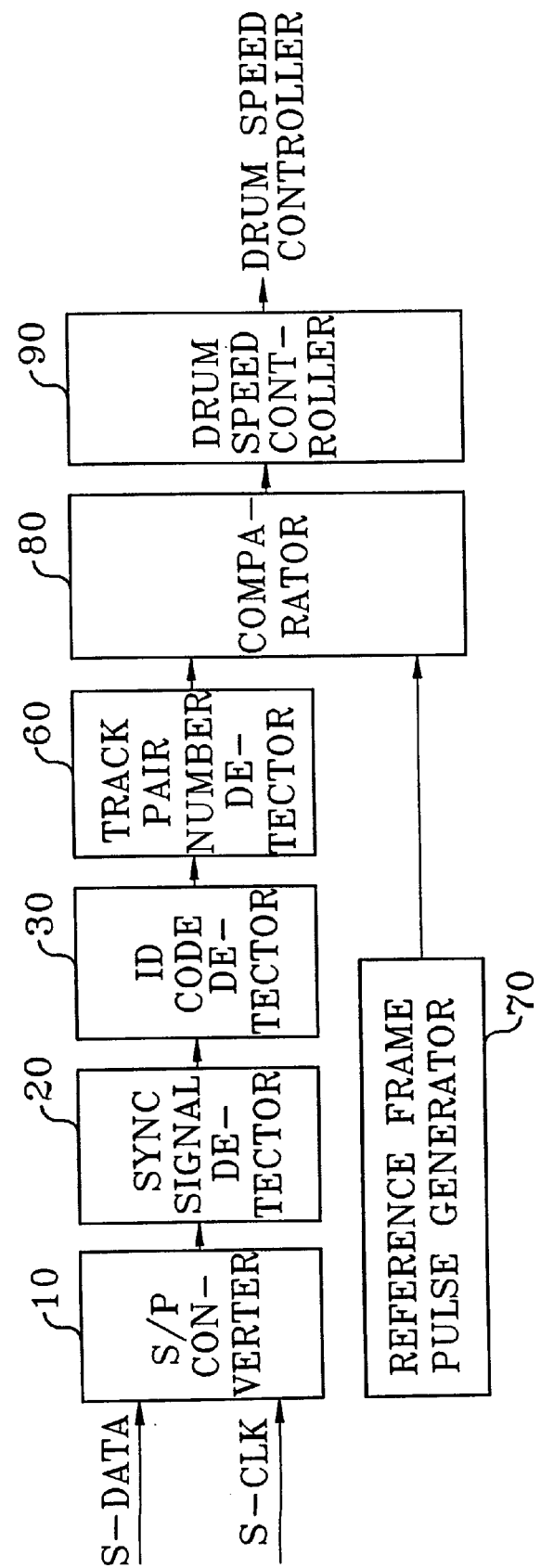
FIG. 7 is a block diagram of a frame pulse generation apparatus for a SD-VCR according to another preferred embodiment of the present invention.

FIG. 7 is a block diagram of a frame pulse generation apparatus for a SD-VCR according to another preferred embodiment of the present invention. In FIG. 7, since the operation of the S/P converter 10, the sync signal detector 20 and the ID code detector 30 are same as those of the FIG. 5 corresponding blocks, the detailed descriptions thereof will be omitted.

A track pair number detector 60 detects a track pair number contained in the ID code detected by the ID code detector 30. A reference frame pulse generator 70 uses a stable system clock, which has no relation with the reproduced signal and generates a reference frame pulse. Here, the reference frame pulse is obtained by dividing the system clock of a higher frequency than that of the frame pulse.

A comparator 80 compares the track pair number corresponding to a level transition point of the reference frame pulse generated in the reference frame pulse generator 70, with the track pair number detected in the track pair number 60, and outputs the result. A drum speed controller 90 determines the current drum control state based on the output of the comparator 80. That is, the drum speed controller 90 concludes that the drum is normally controlled, if the track pair number generated at the level transition point of the reference frame pulse is the same as a reference number, that is, a desired track pair number. If both the track pair numbers are not same, the drum speed controller 90 controls the drum speed so that the track pair number generated at the level transition point of the reference frame pulse becomes the desired track pair number. Particularly, the drum speed controller 90 controls the drum rotational speed to be faster when the track pair number is smaller than the desired track pair number, so that the track pair number detected at the level transition point of the reference frame pulse becomes the desired track pair number. Meanwhile, if the track pair number is larger than desired track pair number, the drum speed controller 90 controls the drum rotational speed to be slower so that the track pair number detected at the level transition point of the reference frame pulse becomes the desired track pair number.

The above-described embodiments use the track pair number in the ID code to generate a frame pulse. However, it is possible to generate a frame pulse using a pilot frequency contained in an ITI sector.

As described above, the present invention can generate a correct frame pulse even though an error occurs in a reproduced signal to thereby enable accurate picture retrieval all the time.

While only certain embodiments of the invention have been specifically described herein, it will apparent that numerous modifications may be made thereto without departing from the spirit and scope of the invention.

What is claimed is:

1. A frame pulse generation apparatus for a standard definition video cassette recorder (SD-VCR) comprising:

a frame base pulse generator, responsive to an input signal reproduced by the SD-VCR, for generating a plurality of frame base pulses based on track pair numbers contained in said input signal and a reference signal; and a phase-locked-loop (PLL) circuit for receiving said frame base pulses supplied from said frame base pulse generator and generating a plurality of final frame pulses having a consistent phase and period so that a final frame pulse is generated at a time where a frame base pulse does not exist due to an error in generating the frame base pulses, said PLL circuit comprising:

a phase comparator coupled to an output of said frame base pulse generator, for comparing the phase of a frame base pulse generated by said frame base pulse generator with that of a current frame pulse, said phase comparator outputting a compare signal in accordance with the result of the phase comparison;

a voltage controlled oscillator (VCO), responsive to said compare signal, for producing a signal oscillating at a frequency according to a control voltage corresponding to said compare signal produced by said phase comparator; and a divider for dividing the oscillation frequency of said signal produced by said VCO to generate a final frame pulse, and feeding the final frame pulse back as said current frame pulse to said phase comparator.

2. The frame pulse generation apparatus for a SD-VCR according to claim 1, wherein said divider divides the oscillation frequency of said signal produced by said VCO to be the same as the frame base pulse when there is no error in said input signal.

3. The frame pulse generation apparatus as defined by claim 1, wherein said PLL circuit further comprises a loop filter disposed between said phase comparator and said VCO, said loop filter producing said control voltage based on said compare signal.

4. The frame pulse generation apparatus as defined by claim 1, wherein said apparatus further comprises:

a serial-to-parallel (S/P) converter for converting said input signal from serial to parallel format;

a sync signal detector coupled to an output of said S/P converter, for detecting a sync signal from the parallel data; and a code detector coupled to an output of said sync signal detector, for detecting an identification code from the parallel data, said input signal, sync signal and identification code being supplied to said frame base pulse generator.

* * * * *